United States Patent
Bleau et al.

(10) Patent No.: US 10,440,099 B2
(45) Date of Patent: Oct. 8, 2019

(54) ACCESSING SERVICES PROVIDED BY COMPUTING DEVICES IN A NETWORK

(71) Applicant: Apple Inc., Cupertino, CA (US)

(72) Inventors: Darryl N. Bleau, Cupertino, CA (US); Jeffrey T. Davey, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 647 days.

(21) Appl. No.: 14/634,430

(22) Filed: Feb. 27, 2015

(65) Prior Publication Data

US 2016/0255137 A1 Sep. 1, 2016

(51) Int. Cl.
*G06F 15/16* (2006.01)
*H04L 29/08* (2006.01)

(52) U.S. Cl.
CPC .......... *H04L 67/10* (2013.01); *H04L 67/2809* (2013.01)

(58) Field of Classification Search
CPC ...................................................... H04L 67/16
USPC ........................................................ 709/217
See application file for complete search history.

(56) References Cited

U.S. PATENT DOCUMENTS

| | | | | |
|---|---|---|---|---|
| 9,590,872 B1* | 3/2017 | Jagtap | ...................... | H04L 41/50 |
| 2010/0074256 A1* | 3/2010 | Seok | ........................ | H04L 69/16 370/392 |
| 2013/0173388 A1* | 7/2013 | Le | ...................... | G06Q 30/0256 705/14.54 |
| 2013/0254325 A1* | 9/2013 | Song | .................... | G06F 17/3048 709/213 |
| 2014/0204826 A1* | 7/2014 | Cherian | ................ | H04W 48/14 370/312 |
| 2015/0269257 A1* | 9/2015 | Edlund | ............. | G06F 17/30864 707/770 |
| 2016/0080519 A1* | 3/2016 | Hansen | ................... | H04L 67/16 709/219 |
| 2016/0150467 A1* | 5/2016 | Shaw | ..................... | H04W 48/18 370/329 |
| 2016/0241665 A1* | 8/2016 | Covell | .................... | H04L 67/10 |
| 2017/0078186 A1* | 3/2017 | Thyni | ................... | H04L 45/124 |

* cited by examiner

*Primary Examiner* — Hamza N Algibhah
(74) *Attorney, Agent, or Firm* — Fletcher Yoder PC (57) ABSTRACT

The described embodiments perform operations to enable access to services provided by applications executing on service providing devices by applications executing in service requesting devices. In the described embodiments, a service providing device executes a "dispatcher" system service that performs operations for interfacing between service-providing applications and service requesting devices. For example, the dispatcher application performs operations for advertising the availability of services on the service providing device and for proxying communication between the service and service requesting devices. In addition, service requesting devices execute a "forwarder" system service that performs operations for interfacing between service-requesting applications and service providing devices. For example, the forwarder application performs operations for recognizing when applications are to access services, selecting an available service for an application to access, and for proxying communication between the application and a service providing device.

28 Claims, 6 Drawing Sheets

ACCESSING SERVICES PROVIDED BY COMPUTING DEVICES IN A NETWORK

BACKGROUND

Field

The described embodiments relate to computing devices. More specifically, the described embodiments relate to accessing services provided by computing devices in a network.

Related Art

Some devices such as personal computing devices (desktop computers, tablet computers, smart phones, media players, etc.), servers, etc. that are connected to a network access services provided by other devices that are connected to the network. For example, a software application executing on a first device may use a network, to which the first device and a second device (desktop computer, tablet computer, smart phone, printer, network attached storage, server, etc.) are connected, to access a database service, a document hosting service, a game service, a print service, or another service provided by software executing on the second device.

Oftentimes, a device may need to access a service on a network, but be unaware if, and which, other devices on the network provide the service. In some systems, in order to access a service, the device sends a request to a central coordinator device (server, desktop computer, etc.) for identification of other devices that provide the service. In such systems, the coordinator device is responsible for acquiring and maintaining a database of all of the available services on the network. Because, in some networks, large numbers of devices provide services, and the services dynamically become available (start up, restart, etc.) and unavailable (terminate, crash, etc.), the acquisition and maintenance of available service information requires an expensive and difficult to operate highly-available, high-bandwidth, and high-throughput coordinator device. In addition, because networks often include many devices that need to access services provided by other devices, the coordinator device must also be able to receive, process, and respond to large numbers of requests for identification of other devices that provide services, increasing the demands on the coordinator device.

BRIEF DESCRIPTION OF THE FIGURES

Throughout the figures and the description, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

TERMINOLOGY

Throughout this description "services" are described as being provided, accessed, communicated with, terminated/crashed, etc. by, for, and on behalf of various applications. Generally, services include any service that can be provided by one or more of an application, operating system, routine, applet, script, firmware, interface, and/or other software or combination of software that executes on at least one service providing device that can be accessed by one or more service requesting devices. For example, services can include database services, file system services, business analysis services, device-specific services (printer, telephony, messaging, manufacturing, control, security, etc.), game services, office productivity application services, media access services (audio, video streaming, purchase, rights acquisition, etc.), web-based/cloud services, retail/commercial services, etc. In some embodiments, some or all of a service can be provided by dedicated/purpose-specific hardware circuits such as programmable logic circuits, application specific circuits (ASICs), etc.

Overview

The described embodiments include a system that performs operations to enable access to services provided by applications executing on service providing devices (e.g., electronic devices executing applications that provide services) by applications executing in service requesting devices (e.g., electronic devices executing applications that access services). In the described embodiments, a service providing device executes a "dispatcher" system service (e.g., application, daemon, operating system routine, etc.) that performs operations for interfacing between service-providing applications and service requesting devices. For example, the dispatcher application performs operations for announcing the availability of services on the service providing device and proxying communication between the service and service requesting devices. In addition, service requesting devices execute a "forwarder" system service (e.g., application, daemon, operating system routine, etc.) that performs operations for interfacing between service-requesting applications and service providing devices. For example, the forwarder application performs operations for recognizing when applications are to access services, selecting an available service for an application to access, and proxying communication between the application and a service providing device.

In some embodiments, the forwarder maintains records of available services in a local cache. In these embodiments, the forwarder, upon determining that an application is to access a particular service on a network, checks the cache to determine if the service has previously been determined to be provided by a service providing device on the network. If the cache includes a record of the service, the forwarder can use the record to attempt to access the same service (i.e., access the service from the same service providing device via the network). Otherwise, the forwarder can send a query to a service list device (e.g., server computer, desktop computer, printer, media processing device, etc.) on the network to determine if the service is available from one or more service providing devices on the network. Assuming that the service is available from at least one service providing device, upon receiving, from the service list device, a response that identifies the services/service providing devices, the forwarder adds corresponding record(s) to the local cache. In this way, aside from an initial query, the forwarder need not send a query to the service list device each time a service is to be accessed.

In some embodiments, the forwarder maintains information about the quality, availability, etc. of services with corresponding records in the local cache. In these embodiments, the forwarder may make decisions about which of two or more service providing devices the service is to be accessed based at least in part on the information. For example, the forwarder can use information about previous network bandwidth (i.e., network bandwidth during one or more previous accesses of the service) for the same service on two different service provider devices to determine the service providing device upon which the service is presently to be accessed.

In some embodiments, applications are configured to communicate with the corresponding forwarder or dispatcher directly. For example, the applications can be configured to make calls/requests (e.g., application programming interface (API) calls, interprocess requests, etc.) to inform the dispatcher that a service is being made available, to inform the forwarder that a service is to be accessed, etc. However, in some embodiments, applications are not configured to communicate with the corresponding forwarder or dispatcher directly. For example, the application may be a "legacy" application that does not include some or all of the program code for communicating with the forwarder or dispatcher (and may more generally be unaware of the existence of the forwarder or dispatcher). In these embodiments, a wrapper service (e.g., application, daemon, operating system routine, etc.) in a service providing device can monitor applications to determine when a service is to be provided/made available and can communicate information about the service to the dispatcher. In addition, in these embodiments, a wrapper service in a service requesting device can monitor applications to determine when an application makes a request to access a service and can communicate information about the request to the forwarder. In this way both legacy applications and applications configured to communicate with the forwarder or dispatcher are supported.

By using the forwarder and the dispatcher as described herein, the described embodiments avoid some of the problems associated with having a centrally-coordinated system for accessing services. For example, the described embodiments avoid the requirement that highly-available, high-bandwidth coordinator devices themselves generate and maintain dynamically updated global records of all the services available in a given network. In addition, by having the forwarder maintain records of available services in the local cache, the described embodiments avoid the forwarder making a request to the service list device each time a service is to be accessed, which reduces the load on the service list device relative to existing centrally-coordinated systems. Also, by making the decision regarding the particular service to be accessed from among two or more service providing devices in the forwarder, i.e., locally, the described embodiments reduce the computational load of the service list device relative to existing centrally-coordinated systems.

Electronic Device

Figure 1:
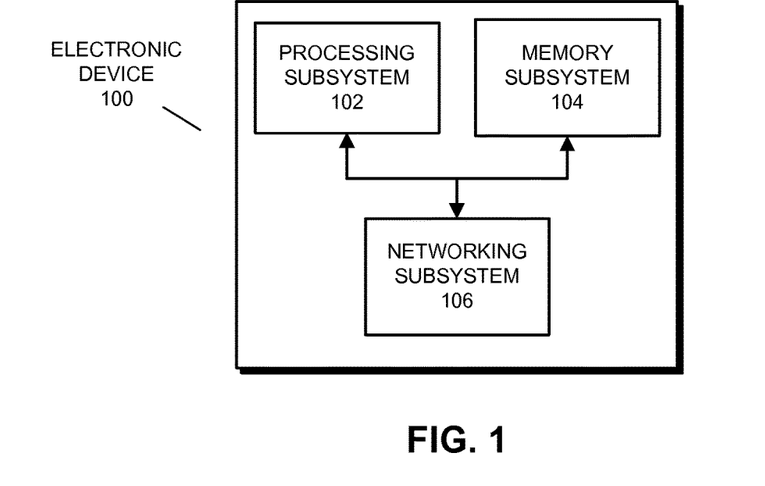
FIG. 1 presents a block diagram illustrating an electronic device in accordance with some embodiments.

FIG. 1 presents a block diagram illustrating electronic device 100 in accordance with some embodiments. Electronic device 100 includes processing subsystem 102, memory subsystem 104, and networking subsystem 106.

Processing subsystem 102 is a subsystem in electronic device 100 that is configured to perform computational operations (e.g., instruction execution, data processing, etc.), control operations, event handling operations, and/or other operations. In some embodiments, processing subsystem 102 includes one or more central processing units (CPUs)/CPU cores, graphics processing units (GPUs)/GPU cores, embedded processors, application specific integrated circuits (ASICs), and/or other computational mechanisms.

Memory subsystem 104 is a subsystem in electronic device 100 that is configured to store data and/or instructions for access by other subsystems in electronic device 100 (e.g., processing subsystem 102, networking subsystem 106, etc.) and perform operations to enable the other subsystems to access the data. In some embodiments, memory subsystem 104 includes volatile memory circuits such as dynamic random access memory (DRAM), static random access memory (SRAM), and/or other types of memory that are used for storing the instructions and data, as well as mechanisms for controlling the memory circuits. In some embodiments, memory subsystem 104 includes a memory hierarchy with one or more caches coupled to the memory circuits (one or more of the caches in the memory hierarchy may be located in processing subsystem 102).

In some embodiments, memory subsystem 104 is coupled to one or more non-volatile high-capacity mass-storage devices (not shown). For example, memory subsystem 104 can be coupled to a magnetic or optical drive, a solid-state drive, or another type of mass-storage device. In these embodiments, memory subsystem 104 can be used by electronic device 100 as fast-access storage for more frequently/recently used data, while the mass-storage device is used to store less frequently/recently used data.

Networking subsystem 106 is a subsystem in electronic device 100 that is configured to couple to and communicate on one or more wired and/or wireless networks. For example, networking subsystem 106 can include one or more of a Bluetooth networking system, a cellular networking system (e.g., a 3G and/or 4G network such as UMTS, LTE, etc.), a universal serial bus (USB) networking system, a networking system based on the standards described in Institute for Electrical and Electronics Engineers (IEEE) 802.11, 802.15, etc. (e.g., a Wi-Fi networking system, etc.), an Ethernet networking system, and/or another networking system. Networking subsystem 106 includes processors, controllers, radios/antennas, sockets/plugs, and/or other devices used for coupling to, communicating on, and handling data and events for each supported networking system.

In the following description, the mechanisms used for coupling to, communicating on, and handling data and events on the network for each network system are referred to collectively as the "interface" or "network interface" for the network system.

In some embodiments, communication paths (that include one or more buses, wires, and/or connections) are coupled between the functional blocks in electronic device 100 (processing subsystem 102, memory subsystem 104, etc.), as shown by arrow-headed lines between the elements. The communication paths are used to transmit commands, data, and/or other information between the elements.

Although specific components are used to describe electronic device 100, in some embodiments, different components and/or subsystems may be included in electronic device 100. For example, electronic device 100 may include one or more additional processing subsystems 102, memory subsystems 104, etc. Additionally, one or more of the subsystems may not be included in electronic device 100 or some or all of the subsystem's functions may be incorporated the other subsystems.

In addition, although electronic device 100 is simplified for illustrative purposes, in some embodiments, electronic device 100 includes additional subsystems, functional blocks, or elements. For example, electronic device 100 may include power subsystems, media processing subsystems, display subsystems, I/O subsystems, audio subsystems, etc. Generally, electronic device 100 includes sufficient subsystems to perform the operations herein described.

Electronic device 100 can be, or can be included in, any device that performs computational operations. For example, electronic device 100 can be, or can be included in, a desktop computer, a laptop computer, a wearable computing device, a tablet computer, a smart phone, a server, a network appliance, a toy, audio-visual equipment (e.g., a set-top box, a stereo receiver, a media player, etc.), an automobile, a home appliance, a controller, etc., and/or combinations thereof.

Network Environment

Figure 2:
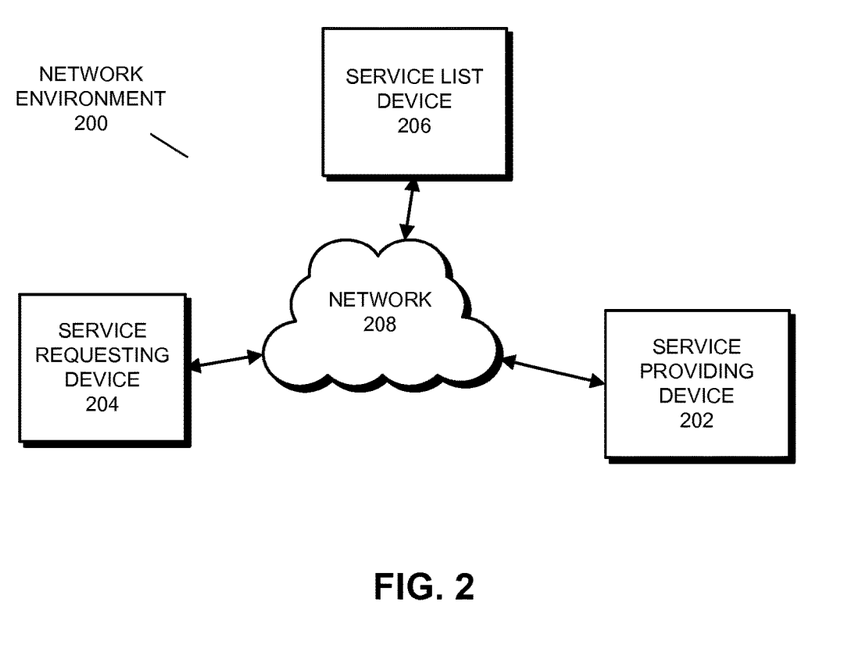
FIG. 2 presents a block diagram illustrating a network environment in accordance with some embodiments.

FIG. 2 presents a block diagram illustrating network environment 200 in accordance with some embodiments. As can be seen in FIG. 2, network environment 200 includes service providing device 202, service requesting device 204, service list device 206, and network 208. Generally, an application (or other software entity) executing on service providing device 202 provides a service that is accessed via network 208 by service requesting device 204 on behalf of an application (or other software entity) executing on service requesting device 204. The operations performed by the devices in the network environment are described in more detail below.

Service providing device 202 is an electronic device that executes (or otherwise hosts or serves as an interface for) applications that provide services. For example, service requesting device may execute applications such as a file hosting service, an office productivity application, a media streaming service, a commercial service, etc., that each provide one or more services. In the described embodiments, the services provided by the applications can include any services that can be accessed via network 208, where "accessing" includes sending data/information to, receiving data/information from, configuring, controlling, and/or otherwise communicating with an application that provides service(s). As described in more detail below, service providing device 202 executes a forwarder application that interfaces between services (i.e., applications that provide the services) and other electronic devices that access the services on service providing device 202 using network 208.

Service requesting device 204 is an electronic device that executes (or otherwise hosts or serves as an interface for) an application that accesses services provided by other electronic devices on network 208. For example, service requesting device may execute applications such as a game application, an office productivity application, etc., that access one or more of the services provided by the service providing devices. As described above, the "accessing" generally includes sending data/information to, receiving data/information from, configuring, controlling, and/or otherwise communicating with an application that provides service(s). As described in more detail below, service requesting device 204 executes a dispatcher application that that interfaces between applications that access services and other electronic devices that provide the services using network 208.

Service list device 206 is an electronic device that hosts a registration service that maintains a record (list, database, etc.) of the services available from electronic devices in network 208. In some embodiments, when a service becomes available, a service providing device, e.g., service providing device 202, registers the service with service list device 206. Then, upon receiving a request for an identification of electronic devices that provide the service from a service requesting device, e.g., service requesting device 204, service list device 206 sends a response that includes an indication that the service providing device is providing the service. The indication includes sufficient information to enable the service requesting device to send a request to access the service to the service providing device.

Network 208 includes one or more wired communication networks and/or wireless communication networks that are arranged to transmit communications between electronic devices connected thereto. Network 208 includes access points, base stations, transmitters/receivers, repeaters, wires/cables, antennas, switches, routers, and/or other elements and functional blocks for communicating on and otherwise controlling the operation of network 208. For example, network 208 may include one or more personal area networks (PANs), local area networks (LANs), and/or wide area networks (WANs, including the Internet). In some embodiments, a first network used to access service list device 206 and a second network used to communicate between service providing device 202 and service requesting device 204 are different networks. For example, the first network may be a WAN and the second network may be a LAN.

In the described embodiments, various types of electronic devices may function as service providing device 202, service requesting device 204, and/or service list device 206. In some embodiments, service providing device 202 is a server computer available via network 208 that provides one or more services, and service requesting device 204 is a personal computing device such as a smart phone or a laptop that accesses the one or more services. In some embodiments, service providing device 202 is an electronic device such as a network-attached storage device, a printer, a home automation device, a home security system, etc. available via network 208 that provides one or more services, and service requesting device is a personal computing device such as a smart phone or tablet computer that accesses the one or more services. In some embodiments, service providing device 202 is a server computer available via network 208 that provides one or more services, and service requesting device 204 is a server computer (perhaps the same server computer as service providing device 202) that accesses the one or more services. In some embodiments, service providing device 202 is a personal computing device available via network 208 that provides one or more services such as game services, data exchange services, voice or video communication services, etc., and service requesting device is a personal computing device that accesses the one or more services. Generally, service providing device 202, service requesting device 204, and service list device 206 can be any two or more devices that can perform the operations herein described.

In some embodiments, each of service providing device 202, service requesting device 204, and service list device 206 is internally arranged similarly to electronic device 100 (i.e., include a processing subsystem 102, a memory subsystem 104, etc.). However, in alternative embodiments, some or all of service providing device 202, service requesting device 204, and service list device 206 include different functional blocks, subsystems, etc. Generally, service providing device 202, service requesting device 204, and service list device 206 each include sufficient functional blocks, subsystems, etc. to perform the operations herein described. For convenience, however, embodiments are described herein in which service providing device 202, service requesting device 204, and service list device 206 are internally arranged similarly to electronic device 100.

Although embodiments are described using the arrangement of electronic devices in FIG. 2, in some embodiments, a different arrangement of functional devices is used. For example, in some embodiments, service providing device 202 and service list device 206 are the same device (i.e., the operations are performed in the same device). As another example, in some embodiments, service providing device 202 is also a service requesting device (i.e., may request access to services provided by other service providing devices) and/or service requesting device 204 is also a service providing device (i.e., may provide access to services to other service requesting devices). As yet another example, in some embodiments, there are a number of service providing devices in addition to service providing device 202, each of which provides one or more services—and two or more of which may provide the same service. As yet another example, in some embodiments, there are a number of service requesting devices in addition to service requesting device 204. Generally, the described embodiments include sufficient devices to perform the operations herein described.

Service Providing Device

Figure 3:
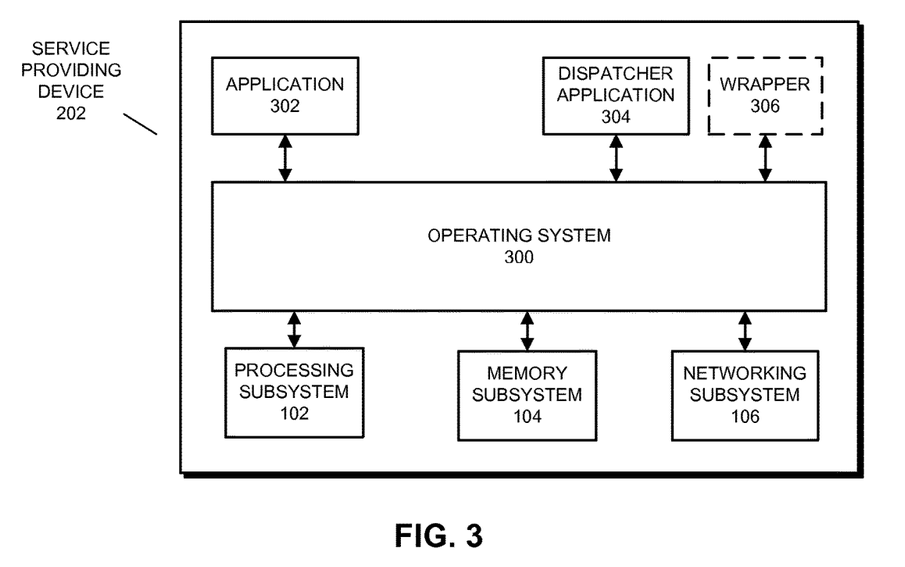
FIG. 3 presents a block diagram illustrating software entities in a service providing device in accordance with some embodiments.

FIG. 3 presents a block diagram illustrating software entities in service providing device 202 in accordance with some embodiments. As can be seen in FIG. 3, the software entities in service providing device 202 include operating system 300, application 302, dispatcher application 304, and wrapper 306. Generally, operating system 300, application 302, dispatcher application 304, and wrapper 306 include software (i.e., program code) that is executed by processing subsystem 102 to perform corresponding operations in service providing device 202.

Operating system 300 serves as an intermediary between system hardware in service providing device 202 (e.g., processing subsystem 102, memory subsystem 104, etc.) and other software entities executed by processing subsystem 102, such as application 302, dispatcher application 304, etc. For example, operating system 300 can be, but is not limited to being, the OS X operating system from Apple Inc. of Cupertino, Calif.; the iOS operating system from Apple Inc.; the Android operating system from Google Inc. of Mountain View, Calif.; the Windows operating system from Microsoft, Inc. of Redmond, Wash.; or another operating system. Aside from operations herein described, operating systems and their general functions are known in the art and hence are not described in detail.

Application 302 provides one or more services that can be accessed by other electronic devices (e.g., service requesting device 204) via network 208. For example, in some embodiments, application 302 is an authentication application that provides a verification service for verifying login information for other electronic devices on network 208. As another example, in some embodiments, application 302 is a file hosting application that provides access to designated files for other electronic devices in network 208.

Dispatcher application 304 serves as an interface between application 302 and other electronic devices that are to access the service provided by application 302. For example, in some embodiments, dispatcher application 304 performs operations for: recognizing when the service provided by application 302 becomes available (e.g., starts up, resumes, etc.) or unavailable (e.g., terminates, halts, crashes, etc.); registering the availability/unavailability of the service; serving as a proxy for communications between other electronic devices and the service; and/or other operations. The operations performed by dispatcher application 304 are described in more detail below.

Wrapper 306 performs operations for enabling dispatcher application 304 to recognize when services provided by legacy applications have become available/unavailable. In some embodiments, wrapper 306 monitors applications in service providing device 202 to determine when a predetermined type of service announcement, advertisement, etc. (e.g., an announcement or advertisement packet or message having a specified format, destined for a particular address/port, etc.) has been made by a monitored application. Wrapper 306 can intercept such announcements, advertisements, etc. and notify dispatcher application 304 of the announcements, advertisements, etc. so that dispatcher application 304 can process the announcements, advertisements, etc. as described herein. In addition, in some embodiments, wrapper 306 monitors services (and, more generally, applications) to determine when the services have become unavailable without the application providing notice (application/service crash, application/service termination, etc.). Upon detecting that a service has become unavailable, wrapper 306 can communicate the unavailability of the service to dispatcher application 304 to be processed as described herein.

As described above, wrapper 306 performs the indicated operations for "legacy" applications, which are applications that, for one reason or another, do not communicate the availability or unavailability of services to dispatcher application 304 (e.g., do not include at least some program code for interacting with dispatcher application 304, are not configured to communicate service availability/unavailability to dispatcher application 304, etc.). In some embodiments, application 302 (and other applications executed by service providing device 202) are "aware" of dispatcher application 304 and thus communicate the availability or unavailability of services to dispatcher application 304. For example, in some embodiments, dispatcher application 304 includes an interface (e.g., an application programming interface (API)) that can be used to invoke various functions of dispatcher application 304—such as announcing the availability/unavailability of a service to dispatcher application 304. Because, in some embodiments, the applications executed by service providing device 202 are aware of dispatcher application 304 and can themselves perform the functions described above as being performed by wrapper 306, wrapper 306 is "optional" (as shown by the dashed lines in FIG. 3) and may not be present.

Although service providing device 202 is described with particular software entities and services, in some embodiments, different arrangements of software entities and/or services may be included in service providing device 202. For example, service providing device 202 may execute one or more applications in addition to or instead of application 302. As another example, application 302 and/or other applications executed by service providing device 202 may provide multiple services, each of which is handled by service providing device 202 as described herein.

Although dispatcher application 304 and wrapper 306 are described and shown "outside" of operating system 300 (i.e., in an "application space" instead of in a "kernel space" for operating system 300) and called, for convenience in this description, "applications," in some embodiments, one or both of dispatcher application 304 and wrapper 306 may run in the kernel space for operating system 300. For example, in some embodiments one or both of dispatcher application 304 and wrapper 306 is an operating system routine or service that is executed by processing subsystem 102 as part of executing the program code for operating system 300.

Service Requesting Device

Figure 4:
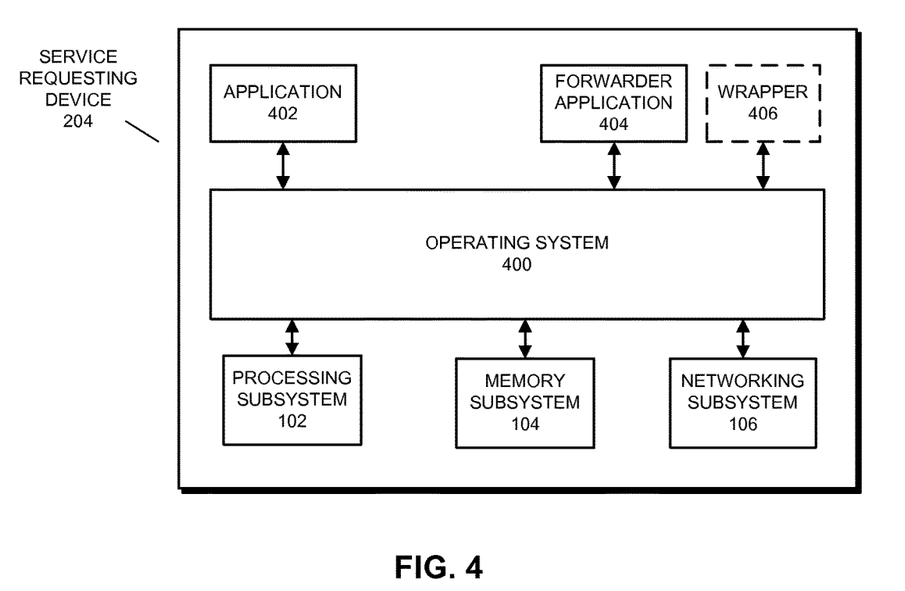
FIG. 4 presents a block diagram illustrating software entities in a service requesting device in accordance with some embodiments.

FIG. 4 presents a block diagram illustrating software entities in service requesting device 204 in accordance with some embodiments. As can be seen in FIG. 4, the software entities in service requesting device 204 include operating system 400, application 402, forwarder application 404, and wrapper 406. Generally, operating system 400, application 402, forwarder application 404, and wrapper 406 include software (i.e., program code) that is executed by processing subsystem 102 to perform corresponding operations in service requesting device 204.

Operating system 400 serves as an intermediary between system hardware in service requesting device 204 (e.g., processing subsystem 102, memory subsystem 104, etc.) and other software entities executed by processing subsystem 102, such as application 402, forwarder application 404, etc. For example, operating system 400 can be, but is not limited to being, the OS X operating system from Apple Inc. of Cupertino, Calif.; the iOS operating system from Apple Inc.; the Android operating system from Google Inc. of Mountain View, Calif.; the Windows operating system from Microsoft, Inc. of Redmond, Wash.; or another operating system. Aside from operations herein described, operating systems and their general functions are known in the art and hence are not described in detail.

Application 402 is an application that accesses services provided by other electronic devices (e.g., service providing device 202) via network 208. For example, in some embodiments, application 402 sends, via network 208, login information to a verification service provided by application 302 (an authentication application) in service providing device 202 in order to have the login information verified by the service. As another example, in some embodiments, application 402 requests, via network 208, access to one or more files from application 302 (a file hosting application) in service providing device 202.

Forwarder application 404 serves as an interface between application 402 and applications executing on other electronic devices that provide a service to be accessed by application 402. For example, in some embodiments, forwarder application 404 performs operations for: receiving an indication that a service is to be accessed by application 402; checking records in a local cache to determine if a record matching the service exists in the local cache and/or sending a request to service list device 206 to determine other electronic devices on which the service is available; requesting access to the service from a selected one of the other electronic devices (e.g., service providing device 202); serving as a proxy for communications for the service between the electronic device and application 402; and/or other operations. The operations performed by forwarder application 404 are described in more detail below.

In some embodiments, forwarder application 404 keeps records of services previously accessed for applications on service requesting device 204. For example, upon accessing a service, forwarder application 404 may add a unique identifier for the service and/or other identifiers for service and/or the corresponding service providing device 202 to a local cache of available services that is stored in memory subsystem 104. Then, the next time the service is to be accessed, forwarder application 404 can check the records in the local cache instead of (or in addition to) sending a request to service list device 206 to determine service providing devices 202 that provide the service (i.e., on which the service has previously been available). In some embodiments, the records of services are each associated with a timeout value that eventually passes, upon which the corresponding record of the service is invalidated or otherwise marked as being older than the timeout value (and thus possibly less reliable).

In some embodiments, forwarder application 404 also records information about or associated with services previously accessed for applications on service requesting device 204. For example, in some embodiments, the above-described records in the cache in memory subsystem 104 include information about or associated with the corresponding previously accessed services. Generally, the information recorded by forwarder application 404 can include any information that can be used to select a service (and thus a service providing device that provides the service) from a group of available services to be accessed. For example, the information can include information about the service itself, information about the service providing device that provides the service, information about the network connection between the service providing device that provides the service and service requesting device 204, information about service requesting device 204, etc. For instance, forwarder application 404 may maintain records in absolute or relative terms of one or more of packet errors, packet retransmission requests, network bandwidth, the corresponding service providing device computational power and/or throughput (operations per time, input/output rates, processing power, memory availability, etc.), network signal strength, service and/or network uptime or downtime, monetary cost for accessing the service, network type (cellular, Wi-Fi, etc.), service quality (precision and accuracy of results/operations, quality of data, etc.), hardware/software versions, functions supported by/not supported by the service and/or service providing device, protocols supported, licenses required, etc. In these embodiments, when a service is to be accessed, forwarder application 404 can query the local cache and/or service list device 206 and determine that two or more service providing devices that are presently providing the service. Forwarder application 404 can then use the recorded information about or associated with the services to determine one of the two or more service providing devices from which the service is to be accessed.

In some embodiments, the records of information about or associated with services previously accessed for applications on service requesting device 204 can be maintained for a period of time, despite, for example, the service not being presently available. In these embodiments, the information can be retrieved and used as described above when the service again becomes available.

Wrapper 406 performs operations for enabling forwarder application 404 to recognize when legacy applications have requested access to services. In some embodiments, wrapper 406 monitors applications in service requesting device 204 to determine when a predetermined type of service request, advertisement, etc. (e.g., a request or advertisement packet or message having a specified format, destined for a particular address/port, etc) has been made by a monitored application. Wrapper 406 can intercept such requests, advertisements, etc. and notify forwarder application 404 of the requests, advertisements, etc. so that forwarder application 404 can process the requests, advertisements, etc. as described herein.

As described above, wrapper 406 performs the indicated operations for "legacy" applications, which are applications that, for one reason or another, do not communicate requests to access services to forwarder application 404 (e.g., do not include at least some program code for interacting with forwarder application 404, are not configured to communicate service requests to forwarder application 404, etc.). In some embodiments, application 402 (and other applications executed by service requesting device 204) are "aware" of forwarder application 404 and thus communicate requests to access services to forwarder application 404. For example, in some embodiments, forwarder application 404 includes an interface (e.g., an application programming interface (API)) that can be used to invoke various functions of forwarder application 404—such as requesting access to a service from forwarder application 404. Because, in some embodiments, the applications executed by service requesting device 204 are aware of forwarder application 404 and can themselves perform the functions described above as being performed by wrapper 406, wrapper 406 is "optional" (as shown by the dashed lines in FIG. 4) and may not be present.

Although service requesting device 204 is described with particular software entities and services, in some embodiments, different arrangements of software entities and/or services may be included in service requesting device 204. For example, service requesting device 204 may execute one or more applications in addition to or instead of application 402 that request access to services provided by other electronic devices, each of which is handled by service requesting device 204 as described herein.

Although forwarder application 404 and wrapper 406 are described and shown "outside" of operating system 400 (i.e., in an "application space" instead of in a "kernel space" for operating system 400) and called, for convenience in this description, "applications," in some embodiments, one or both of forwarder application 404 and wrapper 406 may run in the kernel space for operating system 400. For example, in some embodiments one or both of forwarder application 404 and wrapper 406 is an operating system routine or service that is executed by processing subsystem 102 as part of executing the program code for operating system 400.

Service List Device

Figure 5:
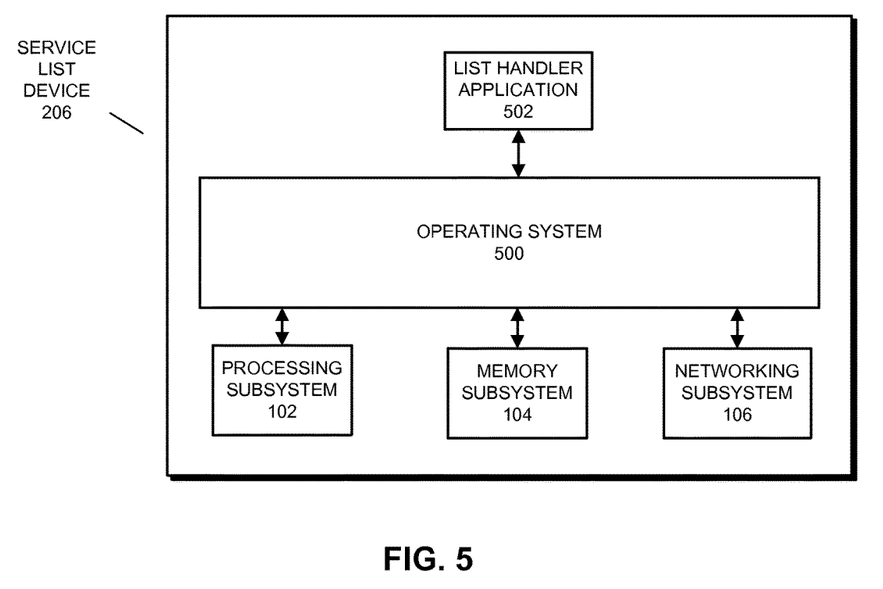
FIG. 5 presents a block diagram illustrating software entities in a service list device in accordance with some embodiments.

FIG. 5 presents a block diagram illustrating software entities in service list device 206 in accordance with some embodiments. As can be seen in FIG. 5, the software entities in service list device 206 include operating system 500 and list handler application 502. Generally, operating system 500 and list handler application 502 include software (i.e., program code) that is executed by processing subsystem 102 to perform corresponding operations in service list device 206.

Operating system 500 serves as an intermediary between system hardware in service list device 206 (e.g., processing subsystem 102, memory subsystem 104, etc.) and other software entities executed by processing subsystem 102, such as list handler application 502, etc. For example, operating system 500 can be, but is not limited to being, the OS X operating system from Apple Inc. of Cupertino, Calif.; the iOS operating system from Apple Inc.; the Android operating system from Google Inc. of Mountain View, Calif.; the Windows operating system from Microsoft, Inc. of Redmond, Wash.; or another operating system. Aside from operations herein described, operating systems and their general functions are known in the art and hence are not described in detail.

List handler application 502 is an application that includes a record of services available from one or more service providing devices in network 208. For example, list handler application 502 can be a database application, a web interface application, a routine, a script, etc. In some embodiments, list handler application 502 performs operations for: receiving from electronic devices (e.g., service providing device 202) registration messages about available services that cause list handler application 502 to add information about the service to the record of services; and receiving and responding to requests from electronic devices (e.g., service requesting device 204) for identification of other electronic devices on which a corresponding service is available. The operations performed by list handler application 502 are described in more detail below.

Note that, in some embodiments, service list device 206 is a "passive" device, in that service list device 206, aside from receiving registrations of services from service providing devices as described above, does not itself "actively" monitor services to determine when services are available/unavailable. In other words, in these embodiments, list handler application 502 on service list device 206 does not send out requests to service providing devices, require periodic updates (e.g., heartbeats, messages, etc.) that services remain available, and/or generate records of services that are provided based on inquiries made by list handler application 502 itself. In this way, the burden on service list device 206 of keeping the above-described records of services is significantly reduced in comparison to previous central coordinators that actively monitored available services.

Although service list device 206 is described with particular software entities and services, in some embodiments, different arrangements of software entities and/or services may be included in service list device 206. For example, service list device 206 may execute one or more applications in addition to list handler application 502.

Although list handler application 502 is described and shown "outside" of operating system 500 (i.e., in an "application space" instead of in a "kernel space" for operating system 500) and is called, for convenience in this description, an "application," in some embodiments, list handler application 502 may run in the kernel space for operating system 500. For example, in some embodiments list handler application 502 is an operating system routine or service that is executed by processing subsystem 102 as part of executing the program code for operating system 500.

Providing a Service

Figure 6:
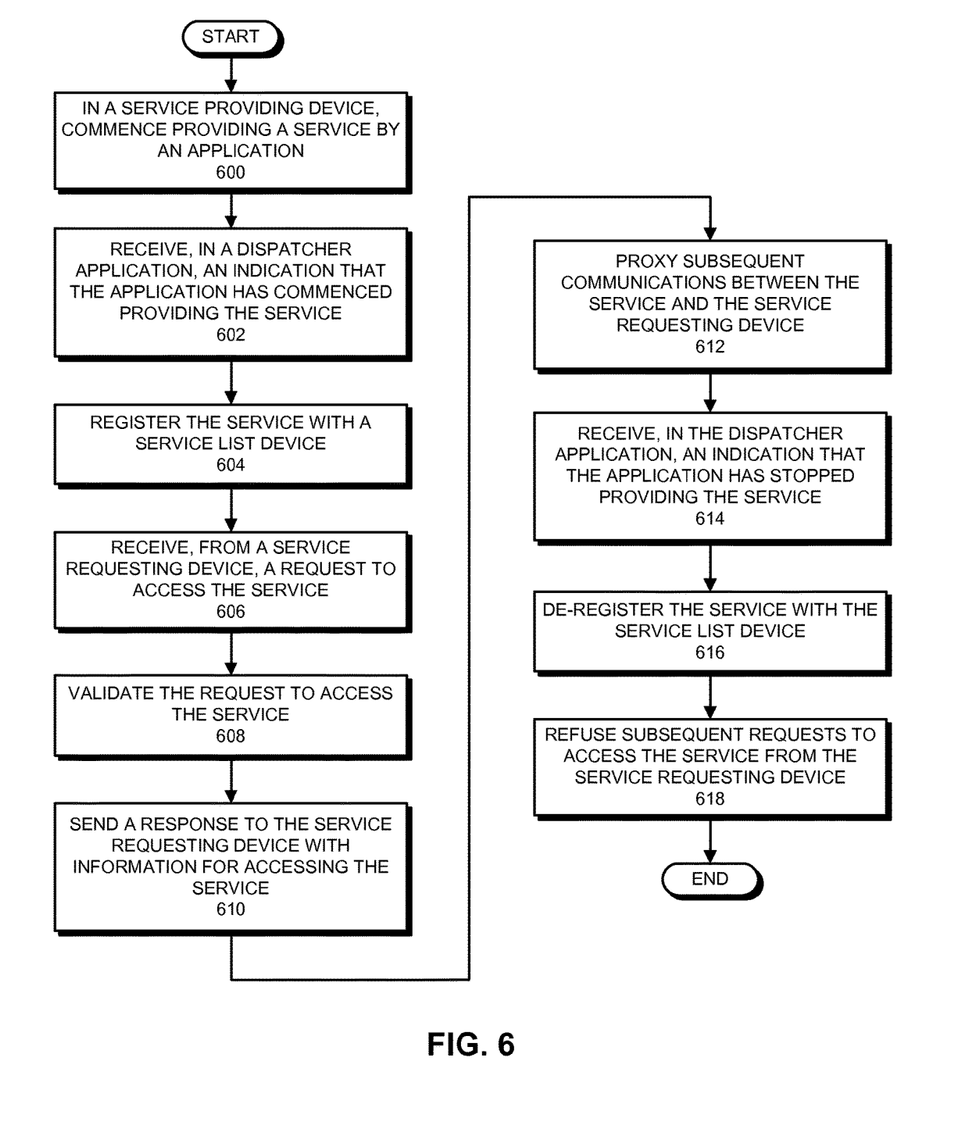
FIG. 6 presents a flowchart illustrating a process for providing a service in accordance with some embodiments.

FIG. 6 presents a flowchart illustrating a process for providing a service in accordance with some embodiments. More specifically, during the process shown in FIG. 6, dispatcher application 304 in service providing device 202 performs operations for registering a service provided by application 302 with service list device 206 and handling subsequent accesses of the service by service requesting device 204. Note that the operations shown in FIG. 6 are presented as a general example of operations performed by some embodiments. The operations performed by other embodiments include different operations and/or operations that are performed in a different order. Additionally, although certain functional blocks and software entities are used in describing the operations (e.g., dispatcher application 304, wrapper 306, etc.), in some embodiments, other functional blocks and software entities perform the operations.

The operations shown in FIG. 6 start when application 302 commences providing a service (step 600). For example, application 302 can be launched/started up and thus commence providing the service, a function of application 302 can be activated while application 302 is already executing that causes application 302 to commence providing the service, application 302 can detect one or more requests, operating conditions, etc. and commence providing the service, etc. As described above, the service is provided by application 302 can be any service that can be provided by an application, e.g., a database service, a business analysis service, a device-specific service, a game service, an office productivity application service, a media access service, a web-based/cloud service, a retail/commercial service, etc.

Dispatcher application 304 then receives an indication that application 302 has commenced providing the service (step 602). For example, in some embodiments, application 302 itself communicates with dispatcher application 304 (e.g., includes program code for communicating with dispatcher application 304, etc.). In these embodiments, application 302 can announce the commencement of the provision of the service to dispatcher application 304. For instance, application 302 can make a service announcement API call using an API provided by dispatcher application 304, send an interprocess message, or otherwise communicate with dispatcher application 304. As another example, in some embodiments, application 302 does not and/or cannot communicate with dispatcher application 304 (e.g., does not include program code for communicating with dispatcher application 304, etc.). In these embodiments, wrapper 306 detects that application 302 has commenced providing the service (e.g., by detecting corresponding activity from application 302, a service announcement from application 302 to a given address, port, socket, etc.) and communicates the indication that application 302 has commenced providing the service to dispatcher application 304.

Dispatcher application 304 then registers the service with service list device 206 (step 604). For example, in some embodiments, dispatcher application 304 communicates a message via network 208 to service list device 206 with a unique identifier (UID) associated with the current instance of the service and/or other information such as an address for service providing device 202. List handler application 502 on service list device 206 adds the UID and the other information to a record of available services and returns an acknowledgement message indicating that the service has been added to a record of available services in service list device 206.

Note that, in some embodiments, the above-described UID is generated/re-generated by dispatcher application 304 for each "instance" when the service is launched. For example, the service may be a print service that is initially launched (a first "instance") with functions A (color printing) and B (black and white printing) activated, for which dispatcher application 304 generates a UID "XYZ." The service may then be restarted, reset, updated, etc. (a second "instance") when the color ink runs out, so that function A is unavailable, and only function B is provided, for which dispatcher application 304 generates a UID "PKQ." By generating and using/registering a different UID for each instance of the service, dispatcher application 304 can control accesses of the service by other electronic devices. In the example above, when a request (described in detail below) is received from a service requesting application with an outdated/not current UID for a service, dispatcher application 304 can decline the request.

Dispatcher application 304 subsequently receives, from service requesting device 204, a request to access the service (step 606). As described above, the request includes the UID for the service (and is sent to service providing device 202 using the address information for service providing device 202 from the registration). As described in more detail below, service requesting device 204 initially acquires the UID and address for service providing device 202 from service list device 206.

Dispatcher application 304 then validates the request to access the service (step 608). For example, dispatcher application 304 can compare the UID from the request to UIDs for presently available services in service providing device 202 and can refuse/decline the request when no matching UID is found in service providing device 202. As another example, dispatcher application 304 can perform one or more operations to ensure that service requesting device 204 is authorized to access the service, including acquiring identification information associated with service requesting device 204 and validating (e.g., requesting validation from a third party electronic device, comparing the identification to an approved-devices list, using encryption with a shared key to encrypt messages, etc.) that service requesting device 204 is authorized to use the service. For this description, it is assumed that service requesting device 204 is an authorized device that is requesting access to the service provided by application 302 (and thus the UIDs match).

Dispatcher application 304 then sends a response to service requesting device 204 with information for accessing the service (step 610). In some embodiments, the information may be as simple as an indication that service requesting device 204 has permission to access the service. However, in other embodiments, more information about the service and/or service providing device 202 may be sent in the response, such as address and/or port information for accessing the service, functions available for/provided by the service, service availability dates/times, hardware/software version numbers, processing power or memory availability in service providing device 202, network bandwidth values, etc.

Dispatcher application 304 then proxies subsequent communications between the service and service requesting device 204 (step 612). In some embodiments, the proxying includes simply forwarding messages from the service to service requesting device 204 and vice versa without substantially changing the content/payloads of the messages. In these embodiments, the messages indicate address information (e.g., address, port, UID) that is used by dispatcher application 304 to determine that the messages are to be forwarded as described above, and the contents/payloads of the messages are passed to the intended destination without modification by dispatcher application 304.

Dispatcher application 304 next receives an indication that the application has stopped providing the service (step 614). As described above, in some embodiments, application 302 itself communicates the indication to dispatcher application 304 via an API call, sending an interprocess message, or otherwise communicating with dispatcher application 304. However, in some embodiments, application 302 does not and/or cannot communicate with dispatcher application 304 and thus wrapper 306 detects that application 302 has stopped providing the service (e.g., by detecting corresponding activity from application 302, a service announcement from application 302 to a given address, port, socket, etc.) and communicates the indication that application 302 has stopped providing the service to dispatcher application 304. Note that the application may have deliberately stopped providing the service, the application and/or service may have crashed, service providing device 202 may have halted/paused the service, etc. Regardless of the reason, dispatcher application 304 receives the above-described indication from some source within service providing device 202.

Dispatcher application 304 then de-registers the service with service list device 206 (step 616). For example, in some embodiments, dispatcher application 304 communicates a message via network 208 to service list device 206 with the UID associated with the current instance of the service and an indication that the service has been stopped. In response, dispatcher application 304 may receive an acknowledgement message indicating that the service has been removed from a record of available services in service list device 206.

Dispatcher application 304 then refuses/declines subsequent requests from service requesting device 204 to access the service (step 618). In some embodiments, the UID for the service may be recorded by dispatcher application 304 as being outdated/invalid or simply deleted. When a request is received by dispatcher application 304 to access a service indicated by an outdated/invalid/not-present UID, dispatcher application 304 refuses the request by sending a response refusing access to the service to service requesting device 204.

Accessing a Service

Figure 7:
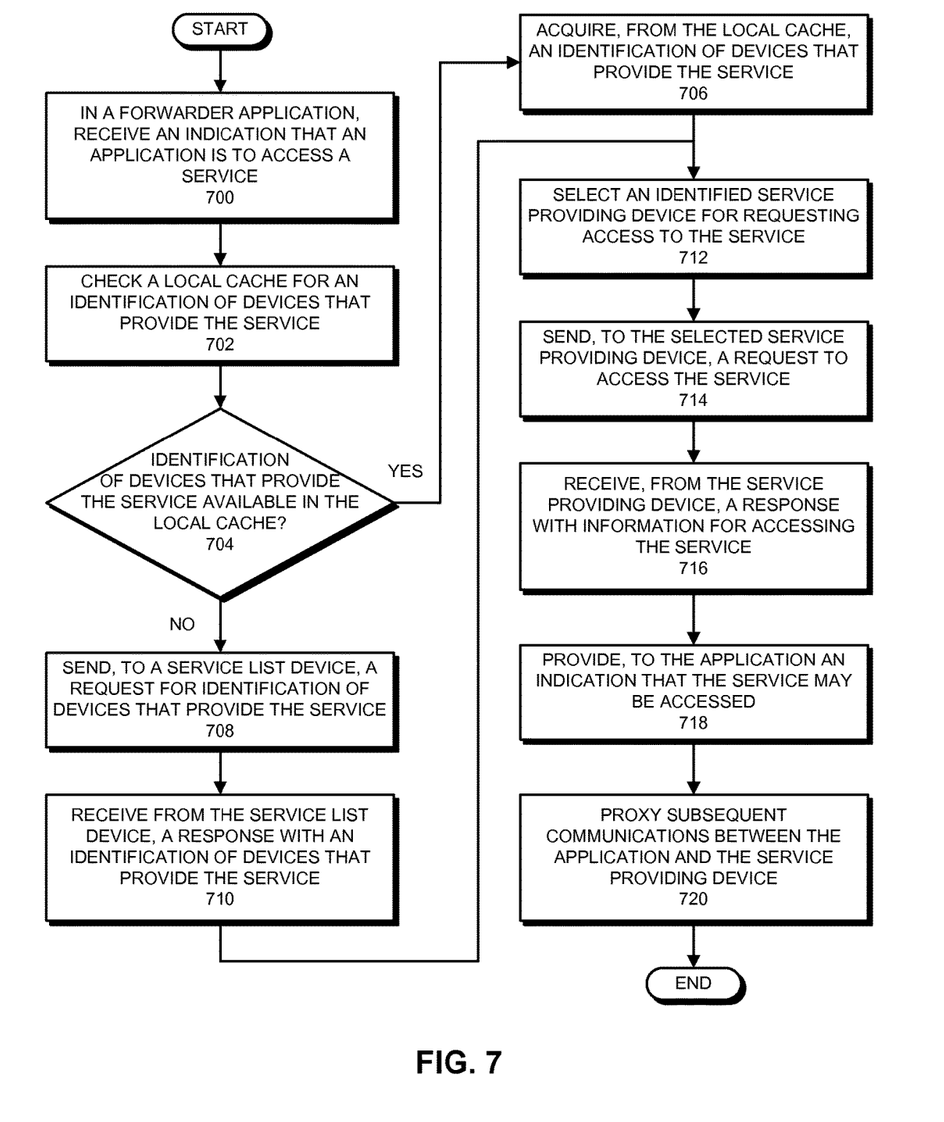
FIG. 7 presents a flowchart illustrating a process for accessing a service in accordance with some embodiments.

FIG. 7 presents a flowchart illustrating a process for accessing a service in accordance with some embodiments. More specifically, during the process shown in FIG. 7, forwarder application 404 in service requesting device 204 performs operations for determining that application 402 is to access a service, selecting a service providing device from which to access the service for application 402, and handling subsequent accesses of the service by application 402. Note that the operations shown in FIG. 7 are presented as a general example of operations performed by some embodiments. The operations performed by other embodiments include different operations and/or operations that are performed in a different order. Additionally, although certain functional blocks and software entities are used in describing the operations (e.g., forwarder application 404, wrapper 406, etc.), in some embodiments, other functional blocks and software entities perform the operations.

The operations shown in FIG. 7 start when forwarder application 404 receives an indication that application 402 is to access a service (step 700). For example, in some embodiments, application 402 itself communicates with forwarder application 404 (e.g., includes program code for communicating with forwarder application 404, etc.). In these embodiments, application 402 sends the request to access the service to forwarder application 404. For instance, application 402 can make a service request API call using an API provided by forwarder application 404, send an interprocess message, or otherwise communicate with forwarder application 404. As another example, in some embodiments, application 402 does not and/or cannot communicate with forwarder application 404 (e.g., does not include program code for communicating with forwarder application 404, etc.). In these embodiments, wrapper 406 detects that application 402 is to access the service (e.g., by detecting corresponding activity from application 402, a service request from application 402 to a given address, port, socket, etc.) and communicates the indication that application 402 has requested access to the service to forwarder application 404. In some embodiments, the above-described indication includes information about the service to be accessed (e.g., a name of the service, a type of the service, etc.) and/or forwarder application 404 can otherwise acquire or generate the information about the service to be accessed.

Forwarder application 404 then checks a local cache for an identification of devices that provide the service (step 702). Recall that, during one or more previous accesses of available services, forwarder application 404 added records identifying the services to the local cache. These records generally identify the service itself (e.g., a name for the service, a type of the service, etc.) as well as identifying the service providing device 202 that provides the service (e.g., a network address of service providing device 202, a human-readable name of service providing device 202, etc.), and include information (e.g., the above-described UID, etc.) that can be used to request access to the service on the corresponding service providing device 202. When checking the local cache to for the identification of devices that provide the service, forwarder application 404 compares information from the indication that application 402 is to access the service (e.g., a name of the service, a type of service to be accessed, etc.) to the records in the local cache to determine if there are one or more records for available services that match the service to be accessed. When the local cache includes an identification of at least one device that provides the service (step 704), forwarder application 404 acquires, from the local cache, an identification of devices that provide the service (step 706). Note that, when the local cache includes an identification of at least one device that provides the service, service requesting device 204 may not send, to service list device 206, a request for an identification of devices that provide the service, which can avoid traffic on network 208 and processing load on service list device 206 (particularly in comparison to existing systems with a central coordinator device such as described above).

When there is not an identification of at least one device that provides the service in the local cache (step 704), forwarder application 404 sends, to service list device 206, a request for an identification of devices that provide the service (step 708). As described above, service list device 206 maintains records of devices that provide services in network 208. Forwarder application 404 then receives, from service list device 206, a response with an identification of devices that provide the service (step 710).

For this description, it is assumed that forwarder application 404 either retrieves, from the local cache, an identification of service providing device 202 and zero or more other devices as providing the service, or receives this information from service list device 206. In other words, prior to step 712, forwarder application 404 is aware of at least one other device in network 208 that provide the service. Note that FIG. 2 only shows one service providing device 202, but, as described above, there may be any number of service providing devices that provide a given service (and possibly other services).

Forwarder application 404 then selects one of the identified devices for requesting access to the service (step 712). During this operation, forwarder application 404 can use the above-described information about or associated with services previously accessed for applications on service requesting device 204 to assist in the selection operation. For example, in an embodiment where the information associated with the service includes information about the processing power (number of cores, etc.) in service providing device 202, forwarder application 404 can compare the processing power for each of the identified devices and select a device with the highest processing power, the lowest processing power (for power conservation purposes), etc. As another example, in an embodiment where the information about the service includes information about version of the software or the functions provided by the service, forwarder application 404 can compare the versions of the software and/or the functions provided by each of the services and select a device with a closest match for version and functions (to a requested version and/or function from the indication in step 700 or another source). Note that, when information about or associated with services previously accessed is not available, such as when a given service has not been previously accessed, forwarder application 404 can select the service using a different standard, such as randomly, according to a network address of the service providing device, etc. For this description, it is assumed that service providing device 202 is the device that is selected by forwarder application 404.

Forwarder application 404 then sends, to service providing device 202 a request to access the service (step 714). The request is sent to service providing device 202 using the above-described information, and includes a UID for the service. As described above, upon receiving the request, dispatcher application 304 in service providing device 202 validates the request and sends a response to the request with information for accessing the service. Forwarder application 404 receives, from service providing device 202, the response with the information for accessing the service (step 716) and provides, to application 302, an indication that the service may be accessed (step 718).

Forwarder application 404 then proxies subsequent communications between application 402 and service providing device 202 (step 720). In some embodiments, the proxying includes simply forwarding messages from application 402 to service providing device 202 and vice versa without substantially changing the content of the messages. In these embodiments, the messages indicate address information (e.g., address, port, UID) that is used by forwarder application 404 to determine that the messages are to be forwarded as described above, and the contents/payloads of the messages are passed to the intended destination without modification by forwarder application 404.

Note that, for FIG. 7, service providing device 202 responded positively to the request to access the service. However, if service providing device 202 had stopped providing the service or otherwise had determined to refuse to provide the service to service requesting device 204, a negative response (denial) would have been received by forwarder application 404. For example, if forwarder application 404 used outdated cached information about available services, when the service is stopped on service providing device 202 for some reason (crashes, application 302 closes, etc.), but the service has not yet been de-registered with service list device 206, etc., the response from service providing device 202 is negative. In this case, forwarder application 404 can re-perform some of the operations shown in FIG. 7 (e.g., starting from step 702 or 708), after updating the local cache to remove information about the service from the local cache (when the information about the service was acquired from the local cache).

In addition, it's possible that no devices in network 208 provide the service, that the request is malformed/incorrect/subject to a network error, etc. In this case, the process can end with forwarder application 404 simply denying application 402 access to the service and/or performing error handling operations.

Communications

Figure 8:
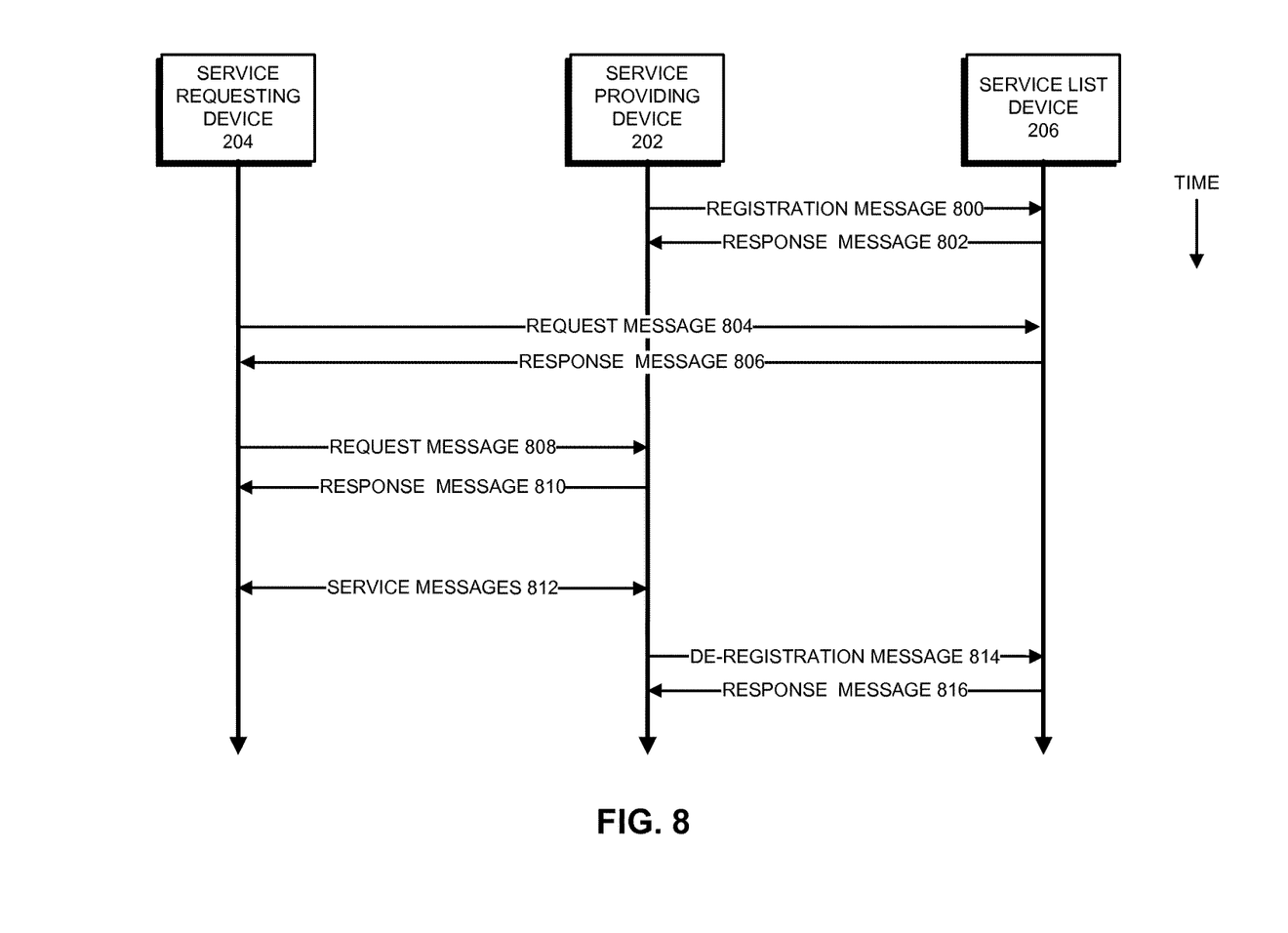
FIG. 8 presents a swim lane diagram illustrating communications between a service providing device, a service requesting device, and a service list device in accordance with some embodiments.

FIG. 8 presents a swim lane diagram illustrating communications between service providing device 202, service requesting device 204, and service list device 206 in accordance with some embodiments. For the swim lane diagram, application 302 executing on service providing device 202 commences providing a service, and dispatcher application 304 and forwarder application 404 perform operations for enabling application 402 to access the service. Note that the communications shown in FIG. 8 are presented as a general example of communications exchanged between devices in some embodiments. The communications performed by other embodiments include different communications and/or communications that are performed in a different order. Additionally, although certain functional blocks and software entities are used in describing the operations (e.g., dispatcher application 302, forwarder application 404, etc.), in some embodiments, other functional blocks and software entities perform the operations.

The communications shown in FIG. 8 start when dispatcher application 304 receives an indication that application 302 has commenced providing a service and sends registration message 800 to service list device 206. Registration message includes a UID for the instance of the service and address information that can be used to request access to the service from service providing device 202. List handler application 502 on service list device 206 adds the information to a record of devices that are providing services in network 208 and returns response message 802 to service providing device 202 indicating that the service was added to the record.

Service requesting device 204 subsequently determines that application 402 is to access the service (i.e., determines that application 402 is to access a service that happens to be of the type provided by application 302) and sends request message 804 to service list device that indicates that service requesting device 204 is to access a requested service. In response, list handler application 502 compares information from the request (e.g., a name of the service, a type of the service, etc.) to the record and determines that a match occurs between the service provided by service providing device 202 and the requested service. List handler application 502/service list device 206 then returns response message 806 to service requesting device 204 with the UID for the service and the address information for contacting service providing device 202.

Recall that request message 804 and response message 806 can be avoided in cases where forwarder application 404 includes, in the local cache, the UID and the address information for service providing device 202. This is true because forwarder application 404 can retrieve this information from the cache, instead of requesting information from service list device 206. For this example, however, it is assumed that service requesting device 204 does not already have the information.

Recall that it is possible that one or more other service providing devices in network 208 (not shown) provide the service and have registered with service list device 206. In this case, response message 806 may include a UID and address information for one or more service providing devices in addition to service providing device 202. When response message 806 indicates multiple devices, if service requesting device 204 includes information about or associated with the service providing devices, the information can be used to select one of the service providing devices from which the service is to be accessed.

Upon receiving and processing response message 806, service requesting device 204 uses the address information for service providing device 202 to send request message 808 to service providing device 202. Request message 808 includes an indication that service requesting device 204 is to access the service, the UID for the service, and possibly information about service requesting device 204, the functions of the service to be accessed, and other information about or associated with the service, service providing device 202, and accessing the service (e.g., a request for particular quality of service, processing resources, bandwidth, etc.). Service providing device 202 processes the request (e.g., validates/authenticates the request and/or service requesting device 204, checks the UID for a match with an available service, determines that service requesting device should be allowed to access the service based on the information from request message 808, etc.) and sends response message 810 to service requesting device 204. Response message 810 includes an affirmation that service requesting device 204 can access the service as well as information about the service and/or service providing device 202, such as an address/port pair for accessing the service, functions provided by the service, the processing power of service providing device 202, etc.

Service requesting device 204 then accesses the service from service providing device 202. As part of accessing the service, service requesting device 204 and service providing device 202 can exchange various service messages 812, which can include service configuration messages, data/information messages, communication messages, etc. In addition, service requesting device 204 enters the information from response message 810 into the local cache, so that the information can be subsequently used as described above.

Dispatcher application 304 then receives an indication that application 302 has stopped providing a service and sends de-registration message 814 to service list device 206. De-registration message includes a UID for the instance of the service and an indication that the service is no longer being provided. List handler application 502 on service list device 206 removes the information from the record of devices that are providing services in network 208 and returns response message 816 to service providing device 202 indicating that the service was removed from to the record.

For the communications in FIG. 8, an appropriate protocol and communication channel (network 208) are used to communicate the messages in packets, signals, units, frames, or any other suitable format. Also, the progress of time in FIG. 8 is downward, with earlier communications closer to the top of the figure and later communications closer to the bottom, as shown by the "time" indicator on the right side of FIG. 8.

In some embodiments, one or more computing devices (e.g., electronic device 100, service requesting device 204, service providing device 202, etc.) use code and/or data stored on a computer-readable storage medium to perform some or all of the operations herein described. More specifically, the one or more computing devices read code and/or data from corresponding computer-readable storage mediums and execute the code and/or use the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, GDDR2/GDDR3/GDDR4, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, Accelerated Processing Units (APUs), controllers, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., electronic device 100, service requesting device 204, service providing device 202, etc. and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A service requesting device, comprising:
   a processing subsystem; and
   a memory subsystem;
   wherein the processing subsystem executes a wrapper, causing the processing subsystem to perform operations for:
      determining that an application executed by the processing subsystem is to access a service by intercepting and identifying, from the application, a predetermined type of service request, wherein the application does not communicate, to a forwarder application, that the application is to access the service; and
      notifying the forwarder application of the predetermined type of service request;
   wherein the processing subsystem executes the forwarder application in response to the notification, causing the processing subsystem to perform operations for:
      determining that the application is to access the service via one or more network connections communicatively coupling the service requesting device to one or more service providing devices;
      when an identification of the one or more service providing devices that provide the service is included in a local cache in the memory subsystem, acquiring the identification of the one or more service providing devices from the local cache;
      when the identification of the one or more service providing devices that provide the service is not included in the local cache, acquiring, from a service list device, the identification of the one or more service providing devices that provide the service, wherein the service list device is separate from the one or more service providing devices that provide the service and the service list device hosts a registration service that maintains a record of services available from the one or more service providing devices;
      in response to the identification of the one or more service providing devices, identifying multiple valid records indicating multiple service providing devices that provide the service:
         acquiring information describing a characteristic of at least one of the multiple service providing devices, the service, or both; and
         based on the information, selecting the service providing device from among the multiple service providing devices for accessing the service; and
      based on the identification of the one or more service providing devices, accessing the service on behalf of the application from the selected service providing device that is selected from among the one or more service providing devices.

2. The service requesting device of claim 1, wherein executing the forwarder application further causes the processing subsystem to perform operations for, upon acquiring the identification of the one or more service providing devices that provide the service from the service list device: adding the identification of the one or more service providing devices that provide the service to the local cache.

3. The service requesting device of claim 2, wherein the identification of the one or more service providing devices comprises, for each of the one or more service providing devices:
   an identification of the service providing device; and
   information for requesting access to the service from the service providing device.

4. The service requesting device of claim 2, wherein executing the forwarder application further causes the processing subsystem to perform operations for:
   subsequently acquiring, from the selected service providing device, information about or associated with at least one of the selected service providing device or the corresponding service; and
   adding the information about or associated with at least one of the selected service providing device or the corresponding service to the local cache.

5. The service requesting device of claim 1, wherein executing the forwarder application further causes the processing subsystem to perform operations for:
   receiving a communication from the application indicating that the application is to access the service, wherein the determining that the application is to access the service is based on receiving the communication.

6. The service requesting device of claim 1, wherein executing the forwarder application further causes the processing subsystem to perform operations for, when accessing the service from the selected service providing device on behalf of the application:
   proxying communications between the selected service providing device and the application.

7. The service requesting device of claim 1, wherein the identification of the one or more service providing devices comprises an identifier for an instance of the service (UID), and wherein executing the forwarder application further causes the processing subsystem to perform operations for, when accessing the service from the selected service providing device on behalf of the application:
   sending a request to the selected service providing device to access a service, the request comprising the UID;
   receiving a response from the selected service providing device that comprises permission to access the service; and
   providing, to the application, an indication that the service may be accessed.

8. A method for accessing a service by a service requesting device, comprising:
   in a processing subsystem, performing operations for a wrapper, the operations comprising:
      determining that an application is to access the service by intercepting and identifying, from the application, a predetermined type of service request, wherein the application does not communicate, to a forwarder application, that the application is to access the service; and
      notifying the forwarder application of the predetermined type of service request; and
   in the processing subsystem, performing operations for the forwarder application in response to the notification, the operations comprising:
      determining that the application is to access the service via one or more network connections communicatively coupling the service requesting device to one or more service providing devices;

when an identification of the one or more service providing devices that provide the service is included in a local cache in a memory subsystem in the service requesting device, acquiring the identification of the one or more service providing devices from the local cache;

when the identification of the one or more service providing devices that provide the service is not included in the local cache, acquiring, from a service list device, the identification of the one or more service providing devices that provide the service, wherein the service list device is separate from the one or more service providing devices and the service list device hosts a registration service that maintains a record of services available from one or more service providing devices;

in response to the identification of the one or more service providing devices, identifying multiple valid records indicating multiple service providing devices that provide the service:
  acquiring information describing a characteristic of at least one of the multiple service providing devices, the service, or both; and
  based on the information, selecting the service providing device from among the multiple service providing devices for accessing the service; and based on the identification of the one or more service providing devices, accessing the service on behalf of the application from the selected service providing device that is selected from among the one or more service providing devices, the accessing comprising interacting with a dispatcher application executed by the service providing device.

9. The method of claim 8, wherein the operations further comprise, upon acquiring the identification of the one or more service providing devices that provide the service from the service list device:
  adding the identification of the one or more service providing devices that provide the service to the local cache.

10. The method of claim 9, wherein the identification of the one or more service providing devices comprises, for each of the one or more service providing devices:
  an identification of the service providing device; and
  information for requesting access to the service from the service providing device.

11. The method of claim 9, wherein operations further comprise:
  subsequently acquiring, from the selected service providing device, information about or associated with at least one of the selected service providing device or the corresponding service; and
  adding the information about or associated with at least one of the selected service providing device or the corresponding service to the local cache.

12. The method of claim 8, wherein the operations further comprise:
  receiving a communication from the application indicating that the application is to access the service, wherein the determining that the application is to access the service is based on receiving the communication.

13. The method of claim 8, wherein the operations further comprise, when accessing the service from the selected service providing device on behalf of the application:
  proxying communications between the selected service providing device and the application.

14. The method of claim 8, wherein the identification of the one or more service providing devices comprises an identifier for an instance of the service (UID), and wherein the operations further comprise, when accessing the service from the selected service providing device on behalf of the application:
  sending a request to the selected service providing device to access a service, the request comprising the UID, wherein the request is configured to cause the service providing device to determine that the instance of the service is presently being provided in the service providing device;
  receiving a response from the selected service providing device that comprises permission to access the service; and
  providing, to the application, an indication that the service may be accessed.

15. The service requesting device of claim 1, wherein the identifying of the multiple valid records comprises identifying multiple records younger than an associated time out value.

16. The service requesting device of claim 1, wherein the information comprises information about quality of the service associated with each of the multiple valid records, availability of the service associated with each of the multiple valid records, or a combination thereof.

17. The service requesting device of claim 16, wherein the information comprises information about hardware versions of at least the service providing device, software versions of at least the service providing device, functions supported by the service, service providing device, or a combination thereof, protocols supported by at least the service providing device, or a combination thereof.

18. The service requesting device of claim 16, wherein the information about the quality of the service associated with the multiple valid records comprises information on precision and accuracy of results, precision and accuracy of operations, quality of data, or a combination thereof.

19. The service requesting device of claim 16, wherein the information about the quality of the service associated with the multiple valid records comprises information on packet retransmission requests in previous accesses of the service from the service providing device associated with at least one of the multiple valid records.

20. The service requesting device of claim 16, wherein the information about the quality of the service associated with the multiple valid records comprises at least one of: information on computation power of the service and downtime of the service providing device associated with at least one of the multiple valid records.

21. The service requesting device of claim 16, wherein the information about the availability of the service associated with the multiple valid records comprises information indicating a network bandwidth between the service providing device associated with at least one of the multiple valid records and the service requesting device.

22. A tangible, non-transitory computer-readable medium configured to store a program for accessing a service by a service requesting device, the program comprising instructions to:
  in a processing subsystem, perform operations for a wrapper, the instructions for the operations comprising:
    determine that an application is to access the service by intercepting and identifying, from the application, a predetermined type of service request, wherein the application does not communicate, to a forwarder application, that the application is to access the service; and notify the forwarder application of the predetermined type of service request; and in a processing subsystem, perform operations for the forwarder application in response to the notification, the instructions for the operations comprising:

determine that the application is to access the service via one or more network connections communicatively coupling the service requesting device to one or more service providing devices;

when an identification of the one or more service providing devices that provide the service is included in a local cache in a memory subsystem in the service requesting device, acquire the identification of the one or more service providing devices from the local cache;

when the identification of the one or more service providing devices that provide the service is not included in the local cache, acquire, from a service list device, the identification of the one or more service providing devices that provide the service, wherein the service list device is separate from the one or more service providing devices and the service list device hosts a registration service that maintains a record of services available from one or more service providing devices;

in response to the identification of the one or more service providing devices, identify multiple valid records indicating multiple service providing devices that provide the service:

acquire information describing a characteristic of at least one of the multiple service providing devices, the service, or both; and based on the information, select the service providing device from among the multiple service providing devices for accessing the service; and based on the identification of the one or more service providing devices, access the service on behalf of the application from the selected service providing device that is selected from among the one or more service providing devices, the accessing comprising interacting with a dispatcher application executed by the service providing device.

23. The computer-readable medium of claim 22, wherein the instructions for the operations comprise, upon acquiring the identification of the one or more service providing devices that provide the service from the service list device:

add the identification of the one or more service providing devices that provide the service to the local cache.

24. The computer-readable medium of claim 23, wherein the identification of the one or more service providing devices comprises, for each of the one or more service providing devices:

an identification of the service providing device; and information for requesting access to the service from the service providing device.

25. The computer-readable medium of claim 23, wherein the instructions for the operations further compromise:

subsequently acquire, from the selected service providing device, information about or associated with at least one of the selected service providing device or the corresponding service; and add the information about or associated with at least one of the selected service providing device or the corresponding service to the local cache.

26. The computer-readable medium of claim 22, wherein the instructions for the operations further compromise:

receive a communication from the application indicating that the application is to access the service, wherein the determining that the application is to access the service is based on receiving the communication.

27. The computer-readable medium of claim 22, the instructions for the operations further compromise, when accessing the service from the selected service providing device on behalf of the application:

proxy communications between the selected service providing device and the application.

28. The computer-readable medium of claim 22, wherein the identification of the one or more service providing devices comprises an identifier for an instance of the service (UID), and the instructions for the operations further compromise, when accessing the service from the selected service providing device on behalf of the application:

send a request to the selected service providing device to access a service, the request comprising the UID, wherein the request is configured to cause the service providing device to determine that the instance of the service is presently being provided in the service providing device;

receive a response from the selected service providing device that comprises permission to access the service; and provide, to the application, an indication that the service may be accessed.

* * * * *